United States Patent
Lortz

(10) Patent No.: US 7,107,610 B2
(45) Date of Patent: Sep. 12, 2006

(54) RESOURCE AUTHORIZATION

(75) Inventor: Victor B. Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 549 days.

(21) Appl. No.: 09/854,437

(22) Filed: May 11, 2001

(65) Prior Publication Data

US 2002/0169986 A1    Nov. 14, 2002

(51) Int. Cl.
G06F 17/30 (2006.01)
G06F 1/26 (2006.01)
H04L 9/32 (2006.01)
G06F 11/30 (2006.01)

(52) U.S. Cl. .................. 726/4; 726/1; 726/2; 713/150; 713/155; 713/156; 713/175; 713/182; 709/223; 709/226

(58) Field of Classification Search ............... 713/155, 713/175, 182, 200, 201, 150, 156; 709/226, 709/229, 223; 726/1, 24
See application file for complete search history.

(56) References Cited

U.S. PATENT DOCUMENTS

| | | | | |
|---|---|---|---|---|
| 5,649,099 A | * | 7/1997 | Theimer et al. ............. | 713/201 |
| 5,689,708 A | * | 11/1997 | Regnier et al. ............. | 709/229 |
| 5,764,890 A | | 6/1998 | Glasser et al. | |
| 5,802,590 A | * | 9/1998 | Draves ........................ | 711/164 |
| 5,941,947 A | | 8/1999 | Brown et al. | |
| 6,067,623 A | * | 5/2000 | Blakley et al. ............. | 713/201 |
| 6,141,754 A | * | 10/2000 | Choy .......................... | 713/200 |
| 6,182,142 B1 | | 1/2001 | Win et al. | |
| 6,226,752 B1 | * | 5/2001 | Gupta et al. .................... | 726/9 |
| 6,233,576 B1 | * | 5/2001 | Lewis ............................ | 707/9 |
| 6,279,111 B1 | * | 8/2001 | Jensenworth et al. ....... | 713/200 |
| 6,353,886 B1 | * | 3/2002 | Howard et al. ............. | 713/156 |
| 6,601,171 B1 | * | 7/2003 | Carter et al. ................ | 713/175 |
| 6,609,198 B1 | * | 8/2003 | Wood et al. ................ | 713/155 |
| 6,668,322 B1 | * | 12/2003 | Wood et al. ................ | 713/182 |
| 2002/0184486 A1 | * | 12/2002 | Kershenbaum et al. ..... | 713/150 |
| 2003/0018786 A1 | * | 1/2003 | Lortz .......................... | 709/226 |

FOREIGN PATENT DOCUMENTS

GB       2 357 225 A   *   8/2001
WO       WO00/56028         9/2000

OTHER PUBLICATIONS

Structure for Decentralized Database Authorization, IBM Technical Disclosure Bulletin, vol. 22, Iss. No. 10, pp. 4692-4694, Mar. 1980.*
IBM Technical Disclosure, Checking Authority of Dataset, vol. 34, Iss. 1, Jun. 1, 1991, pp. 74-77.*

* cited by examiner

Primary Examiner—Taghi T. Arani
(74) Attorney, Agent, or Firm—Crystal D. Sayles

(57) ABSTRACT

Resource authorization includes receiving a resource request from a first requester. The resource request includes credentials and identifies an operation to be performed with respect to a resource. The resource request is mapped to a resource identifier, and the resource data structure is searched for a resource node based on the resource identifier. A determination is made whether the first requester is authorized to perform the operation with respect to the resource based on whether the credentials in the resource request match a resource authorization level associated with the resource node.

29 Claims, 4 Drawing Sheets

RESOURCE AUTHORIZATION

BACKGROUND

This invention relates to resource authorization.

A function of a server computer running on a network is to manage and share resources with client computers. Before a client computer is able to access a particular resource, the client should be authenticated and authorized by the server. One purpose behind the authentication process is to authenticate the identity of the client attempting to access the server's resources. Once the client is authenticated, the server can perform the authorization process and evaluate what privileges the client computer is empowered to exercise over the shared resources.

DETAILED DESCRIPTION

Figure 1:
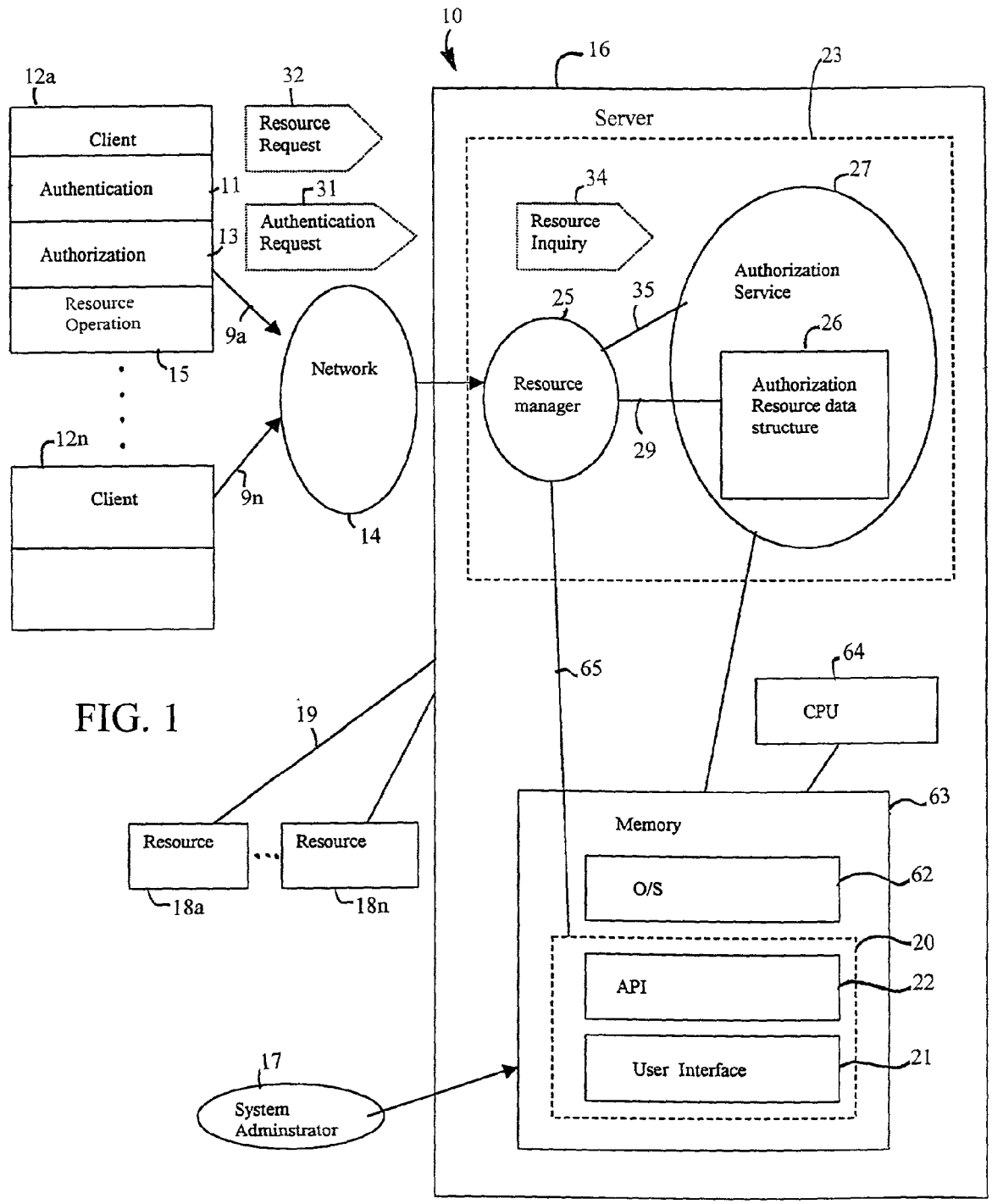
FIG. 1 illustrates an authorization system.

As shown in FIG. 1, an authorization system 10 includes clients 12a–12n that can communicate with a server 16 through communication paths 9a–9n and a network 14. The network 14 can include, for example, the Internet, a loosely administrated consumer network, a local area network (LAN), wide area network (WAN), or other computer network. The server 16 manages and communicates with resources 18a–18n, including information resources, over resource links 19 such as LAN. The information resources can include file systems and hardware resources such as modems, printers, or scanner devices.

Each client 12a–12n may be associated with respective authentication credentials. For example, the client 12a is associated with authentication credentials 11. Each client 12a–12n also is associated with authorization credentials representing the authority or privilege level(s) to which the client is assigned. As illustrated in FIG. 1, client 12a is associated with authorization credentials 13. Each client 12a–12n also is associated with a resource operation representing an operation the client desires to perform using the resource. For example, the client 12a is associated with resource operation 15 representing an operation to access a file residing on a file system, communicate over a modem, print documents using the printer resources, or some other operation.

Each client 12a–12n can generate an authentication request which includes authentication credentials. For example, client 12a generates an authentication request 31 that includes the authentication credentials 11. The request 31 is directed to the server 16 so that the identity of the client 12a can be authenticated by the server when establishing communications with the server over the network 14. The authentication credentials 11 can include a name and password associated with the client 12a. Alternatively, the authentication credentials 11 can be implemented using a private/public key pair such as those used in a public key infrastructure (PKI).

Each client 12a–12n can generate resource requests over the network 14 to access the resources 18a–18n managed by the server. For example, the client 12a can generate resource request 32. The resource-request 32 includes the authorization credentials 13 which are used by the server 16 to determine whether the client has the permission to access the requested resource(s). The authorization credentials 13 can be implemented using an authorization certificate technique such as the method used in simple public key infrastructure (SPKI). In addition, the resource request 32 can include information representing an operation to be performed using the specified resource.

A client, such as client 12a, can delegate its authorization credentials 13 to a second client. Using this delegation technique, the second client can access the server with the same authorization credentials as client 12a. The server 16 treats the credentials of both clients equivalently.

A system administrator 17 is responsible for managing the server 16 and its resources 18a–18n. The responsibilities can include adding/deleting the resources 18a–18n to/from the server 16. The administrator can perform management functions using an application program 20 in cooperation with an operating/system (O/S) 62 such as a Windows NT™ O/S. These programs can be stored in memory 63, such as dynamic random access memory (DRAM) and executed by a central processing unit (CPU) 64 such as an Intel Pentium® processor. The application program 20 can include a user interface 21 to provide a visual representation of an authorization framework 23 and the associated resources 18a–18n. An application program interface (API) 22 can provide a standard communications interface between the application program 20 and the authorization framework 23. The authorization framework 23 includes a resource authorization data structure (resource structure) 26 which is used to establish a relationship between symbolic resource names corresponding to each resource and can include other resource authorization related information.

A resource manager 25 is a program module that can communicate with the application program 20 over path 65 and is responsible for creating and managing the resource structure 26 over path 29. It also may be responsible for mapping resource requests 32 generated by the clients to the appropriate resource related information necessary to satisfy the request. The results of the mapping operation can be communicated to an authorization service 27 by issuing a resource inquiry request 34 over a path 35.

The authorization service 27 executes a program that is responsible for determining whether the client 12a that generated the resource request 32 is authorized to access the requested resource 18a–18n. The service 27 searches the resource structure 26 and verifies whether the client 12a has the proper authorization based, in part, on the authorization credentials 13 accompanying the resource request 32.

The administrator 17, acting as a policy author, can access the resource manager 25 to construct the resource structure 26 based on a set of authorization policies related to the resources 18a–18n. The policies can identify what authorization levels the clients 12a–12n need to have to perform the requested operation included in the resource request 32.

Figure 2:
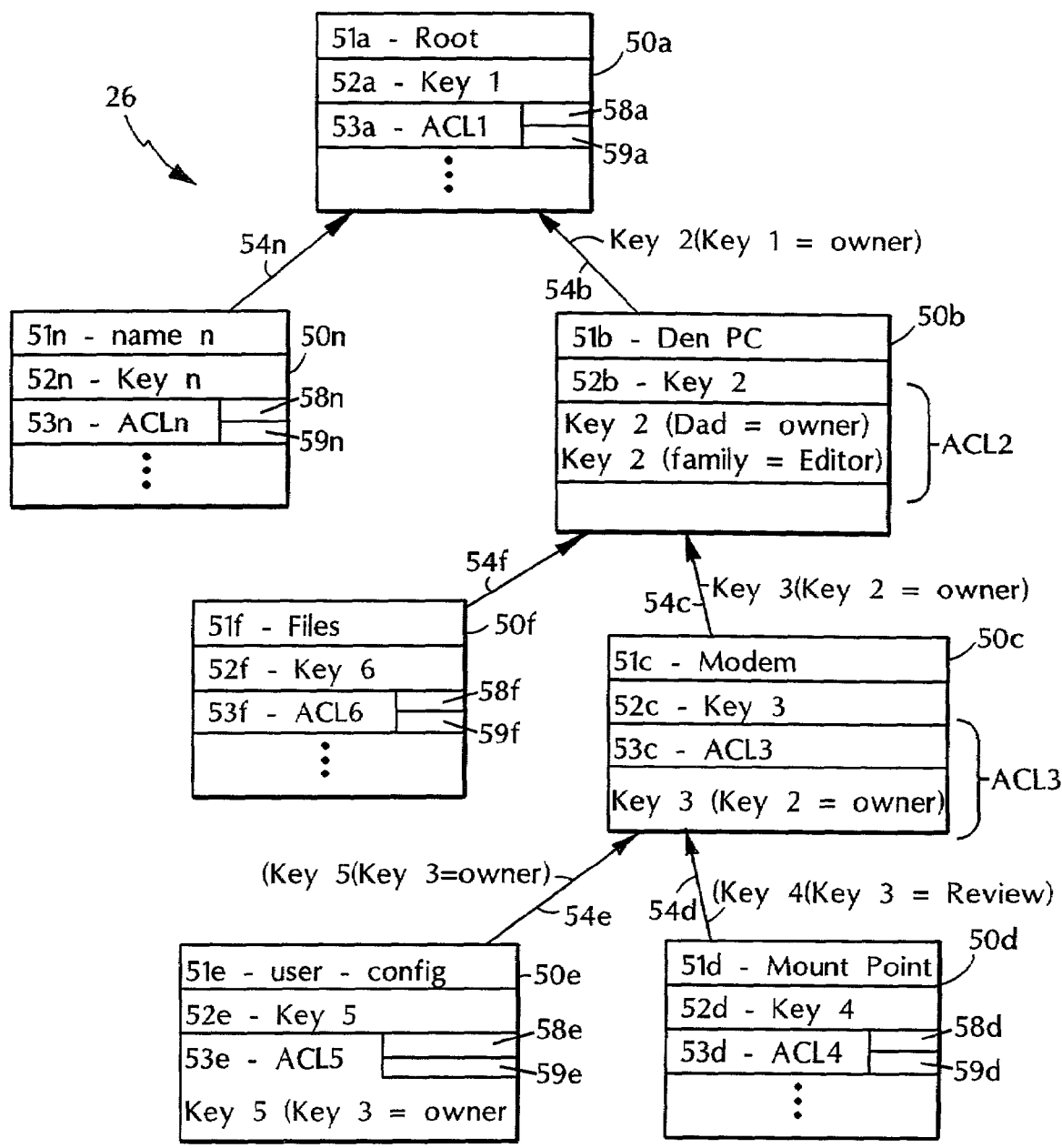
FIG. 2 is an authorization resource data structure.

As shown in FIG. 2, the resource structure 26 can be implemented as a directed graph data structure such as a directed tree data structure. The resource structure 26 corresponds to a resource space representing the names of resources and groups of resources 18a–18n. The resource structure 26 includes a hierarchy of nodes 50a through 50n. A root node 50a provides an anchor point for the additional nodes 50b through 50n. Each node is associated with a respective node name 51a through 51n and a node identifier 52a through 52n. For example, node 50c has a node name 51c of "modem" and a node identifier 52c of "key3". Each node 50a through 50n can be addressed by its node name, node identifier, or a combination of both.

The resource structure 26 can be constructed by resource owners, such as a vendor of resources, who can define the node identifiers 52a through 52n of an authorization sub tree. The sub tree subsequently can be inserted at an appropriate point in the resource structure by the policy author. An authorization sub tree can include a subset of the nodes in a resource structure. For example, a sub tree may include the modem sub tree represented by node 50c as the base of the sub tree and nodes 50d and 50e, as the branches of sub tree. Alternatively, the policy author manually can insert nodes into the structure 26 according to the resource owner's preference. Manually inserted nodes can include keys assigned dynamically by application program 20. However, because the "keys" may be internally generated and not a true public/private key pair, there may be no need to establish a trust model for the internal keys.

The resource structure 26 supports a "mount point" node where the administrator, acting as policy author, can establish top down polices for accessing a resource without needing to know the internal details of how that resource's authorization sub tree is structured. The term "mount point" is analogous to file system mount point and access permission. For example, node 50d is a "manufacturer diagnostics mount point" where the manufacturer of the modem can provide a set of polices dictating the authority necessary to access the diagnostic features of the modem resource.

Each node 50a through 50n in the structure 26 also can be associated with a respective access control list (ACL) 53a through 53n that can include corresponding authorization credentials 58 and authorization level 59. The authorization level 59 refers to the level of authorization needed to access a resource. In one implementation, the authorization levels can have one of the four following values: (1) Owner, (2) Editor, (3) Reviewer, or (4) None. The Owner level permits complete administrative access to the resource, Editor permits read/write access to the resource, Reviewer permits read access to the resource, and None, which is default/implicit level denies all access to a resource. Authorization to edit portions of the resource structure 26 can be controlled by the authorization level. To permit editing a sub tree, for example adding or deleting child nodes, changing names, identifiers and ACLs, the authorization level of the node should be set to "Owner".

The authorization credentials 58 can represent a digital certificate based on the credentials of the client desiring to access the resource. For example, node 50c has an ACL 53c with a value of "key3 (key2=Owner)" indicating that the authorization credentials "key3" are delegated to the authorization level of "Owner" and to the authorization credentials of "key2". The delegation of credentials is shown by the arrow 54c. Thus, the authorization credentials at node 50b corresponding to node identifier 52b ("key2") would be examined to determine authorization. The arrows 54a through 54n indicate authorization credentials based on a delegation of authority from a child node to a parent node.

Figure 3:
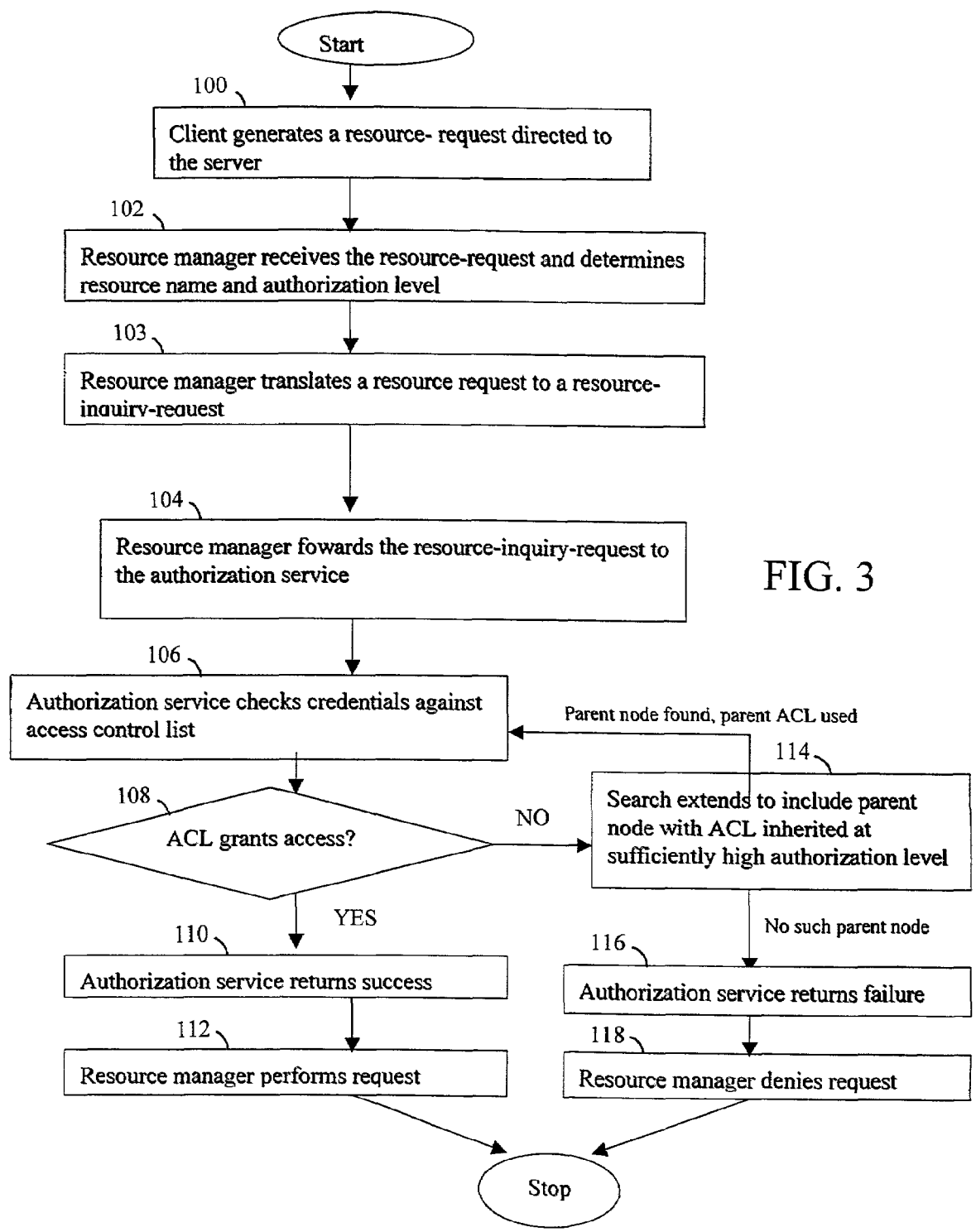
FIG. 3 is a flow chart of a method for authorizing a resource request.

As indicated by FIG. 3, the client 12a generates 100 a resource request directed to the server 16 over the network 14. It is assumed that, for the purposes of the following discussion, the client 12a is able to communicate with the server 16 because the client has already been authenticated by the server through a prior authentication request 31. The resource request 32 (FIG. 4) includes authorization credentials 13 such as a signed digital certificate and a resource operation 15 specified by the client. In this example, the authorization credentials 13 are set to "Dad" and the resource operation 15 is set to "Set Modem Configuration".

After the resource request 32 is received by the server 16, the resource manager 25 maps 102 the resource request to a resource name (or other identifier) and an authorization level based on the information in the resource request.

Figure 5:
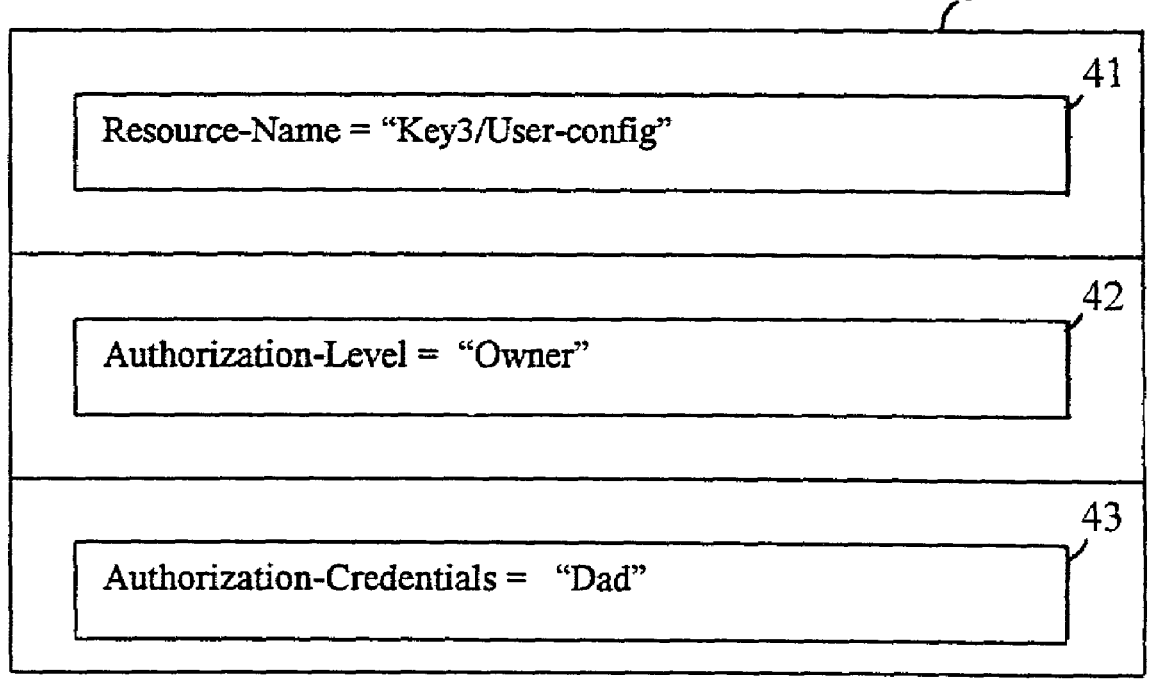
FIG. 5 illustrates a resource inquiry request.

The resource manager 25 translates 103 a resource inquiry request 34 based, in part, on the contents of the resource request 32. As shown in FIG. 5, the resource inquiry request 34 includes a resource name 41 corresponding to the resource derived from the resource operation 15 of the resource request 32. The request 34 also includes an authorization level 42 representing the permission necessary for the client to perform the operation requested. In addition, the request 34 identifies authorization credentials 43 corresponding to the authorization credentials 13 in the resource request 32.

Figure 4:
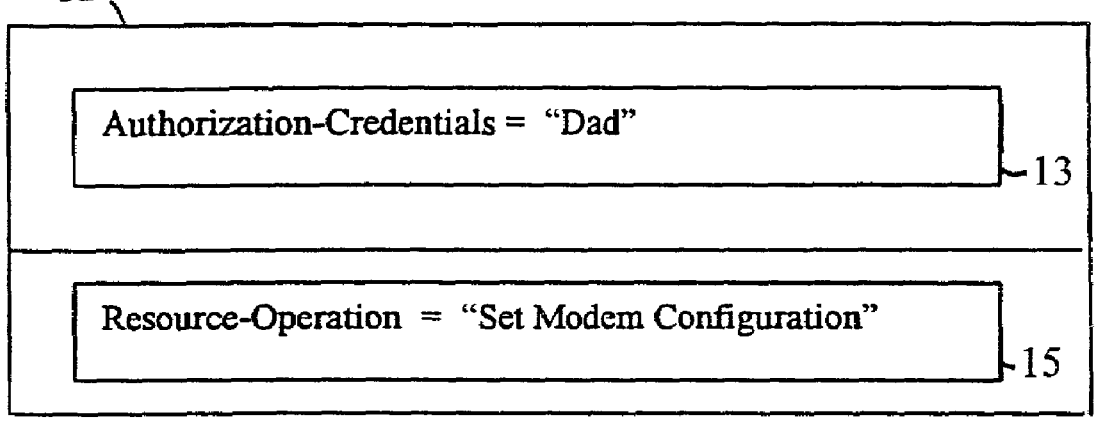
FIG. 4 illustrates a resource request.

For example, using the previous resource request 32 of FIG. 4, the resource manager 25 would determine that (1) the resource name 41 is "Key3/User config" derived from the resource operation 15 "Set Modem Configuration", (2)"Owner" is the necessary authorization level 42 of a particular resource node in the structure 26, and (3) "Dad" is the authorization credentials 43 corresponding to the authorization credentials 13 identified in the resource request 32. The resource manager 25 keeps track of information related to the resource structure 26, including the resource names and associated authorization levels.

As indicated by FIG. 3, the resource manager 25 forwards 104 the request inquiry request 34 to the authorization service 27. Upon receipt of the request 34, the authorization service 27 searches for the resource name in the resource structure 26 and evaluates 106 the authorization credentials and the authorization level of the client against the authorization information in the ACL at the corresponding node. For example, using the resource inquiry request 34 illustrated in FIG. 5, the authorization service 27 would search the resource structure 26 and find that node 50e has a node name 51e "user config" and a node identifier 52e "key5". Node 50e is a child node of the parent node 50c as indicated by the arrow 54e.

If the result of the evaluation indicates 108 that the client is authorized to access the resource based on the information in the ACL, then the authorization service 27 returns 110 a successful reply to the resource manager 25. The resource manager 25 can perform 112 the operation requested by the client because the client has been authorized.

Using the resource request 32 of FIG. 4, the authorization service 27 would traverse the nodes in the resource structure 26 and process the set of credentials "key5(key3=owner)" starting at node 50e, follow the arrow 54e to node 50c credentials "key3(key2=owner)" and follow arrow 54c to node 50b and refer to ACL2 "key2(Dad=Owner)." If the client has an authorization credential set to "Dad," he is authorized as "Owner" to perform the "set modem configuration" operation.

On the other hand, if (at block 108) the ACL associated with the node does not grant access to the client, then the authorization service 27 searches 114 for a parent node having an ACL with a sufficiently high authorization level to permit the client to access the resource. If a parent node is found, then the ACL and associated authorization level and authorization credentials are forwarded to the authorization service 27. The process would then return to block 106 where the authorization service 27 checks credentials of the client against information in the ACL.

However, if (at block 114) the search results indicate that no parent node exists with an ACL inherited at a sufficiently high authorization level, then the authorization service 27 returns 116 a failure result to the resource manager 25. The resource manager is denied 118 access to the resource and may communicate the denial to the client.

If a client with the authorization credentials identified above again attempted to access the "mount point" corresponding to node 50d, the client would be denied access because node 50d only delegates the authorization level of "reviewer" to its parent node 50c as shown by the arrow 54d. The node 50c has a ACL3 with a value of "key3 (key2=owner)" indicating that the credentials are delegated to node 50b as shown by arrow 54c. Therefore, referring to node 50b with a node name 51b "DenPC", the authorization level assignment of "key2(Dad=Owner)" at ACL 53b does not authorize "Dad" to access the "mount point" node 50d.

Using the foregoing techniques a resource vendor, such as a manufacturer, can define its own public/private key and require the client to use the key in order to gain access to certain aspects of the modem such as the modem's diagnostics feature. By limiting access to the diagnostics feature to authorized clients, the manufacturer can use the authorization framework 23 to enforce custom security restrictions.

The foregoing techniques can allow authorization to be shared across multiple applications including distributed systems that span different administrative domains. Furthermore, the techniques can be applied to solve problems relating to securing service gateway platforms for the consumer market. The techniques also can be used in the context of electronic business ("e business") solutions for either business to business or business to consumer service applications, where the endpoints of communications are inherently part of different administrative domains.

Although four authorization levels are discussed above, it is possible to increase the granularity of the levels.

Various features of the system can be implemented in hardware, software, or a combination of hardware and software. For example, some aspects of the system can be implemented in computer programs executing on programmable computers. Each program can be implemented in a high level procedural or object oriented programming language to communicate with a computer system. Furthermore, each such computer program can be stored on a storage medium, such as read only memory (ROM) readable by a general or special purpose programmable processor for configuring and operating the computer when the storage medium is read by the computer to perform the functions described above.

Other implementations are within the scope of the following claims.

What is claimed is:

1. A method comprising:
   receiving a resource request from a first requestor, the resource request including credentials and identifying information regarding an operation to be performed with respect to a resource;
   mapping the resource request to a resource identifier;
   translating the resource request to a resource inquiry request, the resource inquiry request including a resource authorization parameter representing a permission level necessary for a client to perform the operation, the permission level from the group consisting of owner level, editor level, reviewer level and none level;
   searching a resource data structure for a resource node based on the resource identifier; and
   determining whether the first requestor is authorized to perform the operation with respect to the resource based on whether the credentials in the resource request match the resource authorization parameter associated with the resource node.

2. The method of claim 1 wherein searching includes searching resource nodes each of which represents a resource and includes a resource identifier.

3. The method of claim 1 wherein searching includes searching a directed graph structure.

4. The method of claim 1 wherein receiving a resource request includes receiving a digital certificate conforming to a simplified public key infrastructure.

5. The method of claim 1 wherein mapping includes mapping the resource request to the resource identifier and the resource authorization parameter, wherein the resource authorization parameter of the owner level authorizes complete access to the resource.

6. The method of claim 1 wherein mapping includes mapping the resource request to the resource identifier and the resource authorization parameter, wherein the resource authorization parameter of the editor level authorizes read/write access to the resource.

7. The method of claim 1 wherein mapping includes mapping the resource request to the resource identifier and the resource authorization parameter, wherein the resource authorization parameter of the reviewer level authorizes read only access to the resource.

8. The method of claim 1 wherein mapping includes mapping the resource request to the resource identifier and the resource authorization parameter, wherein the resource authorization parameter of the none level denies all access to the resource.

9. The method of claim 1 including delegating the credentials of a child node to a parent node in the resource data structure.

10. The method of claim 9 in which the resource request is handled based on the delegated credentials.

11. The method of claim 1 wherein the resource request originates from a client computer directed to a server computer over a network.

12. An apparatus comprising:
   a memory for storing a resource data structure having resource nodes each of which represents a respective resource and which has a respective resource identifier, a resource authorization credential, and a resource authorization level from the group consisting of owner level, editor level, reviewer level and none level; and
   a processor configured to:
     receive a resource request from a first requestor, the resource request including credentials and identifying information representing an operation to be performed with respect to a resource;
     map the resource request to a resource identifier;
     search the resource data structure for a resource node based on the resource identifier; and
     determine whether the first requestor is authorized to perform the operation with respect to the resource based on whether the credentials in the resource request match the resource authorization credential and the resource authorization level associated with the resource node.

13. The apparatus of claim 12 wherein the resource data structure comprises a directed graph structure.

14. The apparatus of claim 12 wherein the credentials include a digital certificate conforming to a simplified public key infrastructure.

15. The apparatus of claim 12 wherein the resource authorization level of the owner level authorizes complete access to the resource.

16. The apparatus of claim 12 wherein the resource authorization level of the editor level authorizes read/write access to the resource.

17. The apparatus of claim 12 wherein the resource authorization level of the reviewer level authorizes read only access to the resource.

18. The apparatus of claim 12 wherein the resource authorization level of the none level denies all access to the resource.

19. The apparatus of claim 12 wherein the resource data structure includes the delegation of a resource authorization level from a child node to a parent node.

20. A system comprising:
a first computer associated with a first requestor configured to generate resource requests with credentials;
a second computer including memory storing a resource data structure with resource nodes each of which represents a respective resource and which has a respective resource identifier, a resource authorization parameter, and a resource authorization level, and the second computer configured to:
receive a resource request from a first requestor, the resource request including credentials and identifying information representing an operation to be performed with respect to a resource;
map the resource request to a resource identifier;
translate the resource request to a resource inquiry request to include the resource authorization parameter, the resource authorization parameter representing a permission level necessary for a client to perform the operation, the permission level from the group consisting of owner level, editor level, reviewer level, and none level;
search the resource data structure for a resource node based on the resource identifier; and
determine whether the first requestor is authorized to perform the operation with respect to the resource based on whether the credentials in the resource request match the resource authorization parameter associated with the resource node; and
a network over which the first and second computers communicate.

21. The system of claim 20 wherein the resource data structure comprises a directed graph data structure.

22. The system of claim 20 wherein the credentials include a digital certificate conforming to a simplified public key infrastructure.

23. The system of claim 20 including the delegation of the credentials from a child node to a parent node.

24. The system of claim 20 including the delegation of credentials associated with the first requester to a second requester wherein the second requester can request resources using the credentials from the first requester as if it were the first requester.

25. An article comprising a computer readable medium that stores computer executable instructions for causing a computer system to:
map a resource request to a resource identifier, in response to receiving the resource request from a first requestor, the resource request including credentials and identifying information representing an operation to be performed with respect to a resource;
translate the resource request to a resource inquiry request, the resource inquiry request including a resource authorization parameter representing the permission level necessary for a client to perform the operation, the permission level from the group consisting of owner level, editor level, reviewer level, and none level;
search a resource data structure for a resource node based on the resource identifier; and
determine whether the first requestor is authorized to perform the operation with respect to the resource based on whether the credentials in the resource request match the resource authorization parameter associated with the resource node.

26. The article of claim 25 including instructions for causing the computer system to have a directed graph data structure with resource nodes representing resources including a resource identifier and a resource authorization level.

27. The article of claim 25 including instructions for causing the computer system to have digital certificates conforming to a simplified public key infrastructure.

28. The article of claim 25 including instructions for causing the computer system to delegate the credentials of a child node to a parent node.

29. The article of claim 25 including instructions for causing the computer system to delegate the credentials associated with the first requester to a second requestor to allow the second requestor to request resources using the credentials from the first requestor as if it were the first requestor.

* * * * *